United States Patent
Wheeler et al.

(10) Patent No.: US 9,206,624 B2
(45) Date of Patent: Dec. 8, 2015

(54) ELECTRONIC CABLE LOCK SYSTEM

(75) Inventors: Thomas J. Wheeler, Pomona, CA (US); Brian A. Whipple, La Verne, CA (US); Michael A. Webb, Cave Creek, AZ (US); Joshua T. Peabody, Phoenix, AZ (US); Matthew Lynn Petersen, Phoenix, AZ (US); Robert William Lewis, Apache Junction, AZ (US); William Chungsum Chow, Rowland Heights, CA (US); Scott Patrick Sullivan, Glendale, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 411 days.

(21) Appl. No.: 13/617,777

(22) Filed: Sep. 14, 2012

(65) Prior Publication Data

US 2013/0067966 A1 Mar. 21, 2013

Related U.S. Application Data (60) Provisional application No. 61/536,014, filed on Sep. 18, 2011.

(51) Int. Cl.
*E05B 67/06* (2006.01)
*E05B 67/00* (2006.01)
(Continued)

(52) U.S. Cl.
CPC .............. *E05B 67/003* (2013.01); *B23P 11/00* (2013.01); *E05B 21/06* (2013.01); *E05B 45/005* (2013.01); *E05B 47/0012* (2013.01); *E05B 73/0005* (2013.01); *G07C 9/00944* (2013.01); *E05B 1/00* (2013.01); *E05B 15/1614* (2013.01); *E05B 17/2084* (2013.01); *E05B 21/00* (2013.01);

(Continued)

(58) Field of Classification Search
CPC ........... E05B 1/00; E05B 21/00; E05B 39/00; E05B 47/00; E05B 55/00; E05B 63/00; E05B 69/00; E05B 77/00; E05B 67/003; E05B 21/06; E05B 45/005; E05B 45/10; E05B 47/0012; E05B 73/0005; E05B 15/1614; E05B 17/2084; E05B 2047/0086; G07C 9/00944; B23P 11/003; Y10T 70/402; Y10T 29/49833
USPC ........................ 70/30, 49, 53, 57.1, 233–236, 70/277–278.3, 278.6, 278.7, 279.1, 283.1; 340/427, 432, 542
See application file for complete search history.

(56) References Cited

U.S. PATENT DOCUMENTS 4,051,703 A * 10/1977 Plaiss .............................. 70/371
4,680,574 A * 7/1987 Ruffner ......................... 340/571

(Continued)

*Primary Examiner* — Suzanne Barrett
*Assistant Examiner* — Morgan McClure
(74) *Attorney, Agent, or Firm* — Woods Oviatt Gilman, LLP; Ronald J. Kisicki, Esq.

(57) ABSTRACT

An electromechanical cable lock system comprising an electromechanical locking mechanism including a cable having at least one plug end receivable in the locking mechanism and a plurality of slidable locking plates engageable with the plug in said locking mechanism. At least one of the locking plates is capable of movement in a first direction different from the movement of a second of said locking plates in a second direction. The locking plates are driven by a motor-driven cam mechanism. The system includes a card reader or other credential verifying device and an electronic controller for activating the locking mechanism, The system also includes a barrel lock for over-riding the electronic controller. A plurality of features can detect and alarm in the event of tampering or unauthorized entry.

25 Claims, 7 Drawing Sheets

(51) Int. Cl.
*G07C 9/00* (2006.01)
*E05B 47/00* (2006.01)
*E05B 21/06* (2006.01)
*B23P 11/00* (2006.01)
*E05B 45/00* (2006.01)
*E05B 73/00* (2006.01)
*E05B 1/00* (2006.01)
*E05B 21/00* (2006.01)
*E05B 17/20* (2006.01)
*E05B 45/10* (2006.01)
*E05B 15/16* (2006.01)

(52) U.S. Cl.
CPC ............... *E05B45/10* (2013.01); *E05B 47/00* (2013.01); *E05B 2047/0086* (2013.01); *Y10T 29/49833* (2015.01); *Y10T 70/402* (2015.04)

(56) References Cited

U.S. PATENT DOCUMENTS

| | | | | |
|---|---|---|---|---|
| 5,050,836 | A * | 9/1991 | Makous | 248/553 |
| 6,282,931 | B1 * | 9/2001 | Padiak et al. | 70/279.1 |
| 6,384,717 | B1 * | 5/2002 | DeVolpi | 340/432 |
| 6,604,400 | B1 * | 8/2003 | Gretz | 72/334 |
| 6,731,212 | B2 * | 5/2004 | Hirose et al. | 340/572.9 |
| 7,921,682 | B1 * | 4/2011 | Chang | 70/38 A |
| 8,028,551 | B2 * | 10/2011 | Kalous | 70/38 B |
| 2009/0282876 | A1 * | 11/2009 | Zuraski et al. | 70/35 |
| 2009/0293562 | A1 * | 12/2009 | Fisher et al. | 70/278.7 |
| 2011/0260867 | A1 * | 10/2011 | McCracken et al. | 340/568.4 |
| 2012/0144885 | A1 * | 6/2012 | Mills | 70/57.1 |

* cited by examiner

ELECTRONIC CABLE LOCK SYSTEM

This application claims the benefit of U.S. Provisional Application No. 61/536,014, filed Sep. 18, 2011.

TECHNICAL FIELD

The present invention relates to lock systems employing a locking element including a flexible cable; more particularly, to an electromechanical lock system employing a cable; and most particularly, to such a system having a plurality of mode options for activating the locking mechanism and a plurality of different mechanisms for defeating attack.

BACKGROUND OF THE INVENTION

Locking systems employing a flexible cable are well known. In such a system, a tamper-resistant cable is threadable through an opening in the item(s) to be secured and may be lockably attached at both cable ends to prevent unwanted removal of the item from the cable and the premises. Some prior art cable lock systems are as simple as having loops formed on each end of the cable secured by a keyed padlock or a combination lock. Other cable lock systems may include a simple lock case into which one or both ends of the cable may be inserted, the cable ends having lockable features formed thereon. The locking mechanism may be a barrel lock, openable by a key, or a slidable locking plate movable by correct rotation of a number combination, that engages with a detent in the cable end.

The above mentioned systems are not significantly tamper-proof and lack electronic means for indicating by alarm any attempt at tampering. In some prior art locks of the lock-case type, the lock case may be opened relatively easily to gain access to the lock mechanism. Further, it is known that a slidable locking plate may be dislodged to the open position by a blow to the lock housing.

What is needed in the art is an improved cable lock system that may be opened by a plurality of actuating means; that includes one or more tamper-defeating features; and that can provide an alarm in response to an attempt at tampering.

It is a principal object of the present invention to provide secure retention of one or more items that may be strung on a locking cable.

SUMMARY OF THE INVENTION

Briefly described, the present invention is directed to an electronic cable lock system capable of being unlocked using a card reader or other credential verifying apparatus, and preferably also being unlockable by a key. The system is suitable for use by, for example, hardware stores for locking merchandise together in an unsecured area to prevent theft. The system includes a housing containing a card reader, a circuit board, a motor, and a key operated, over-riding cylinder lock, and may be mounted on a wall or post.

Key features of a cable lock system in accordance with the present invention are:

Hardened sheet metal plates—the sides and top of the mechanism are shielded by hardened metal plates to prevent tampering.

Cylinder lock tamper detection—a micro-switch at the base of the cylinder lock detects the rotation of the cylinder to differentiate between key unlock and credential unlock.

Cable/end plug connections—the plugs are designed to mechanically pierce the end of the mating cable, the plug is then torqued down on the cable end to secure it in place. Flats are provided on the end plugs to facilitate torqueing. A set screw is used to temporarily hold the cable in place while the end plug is torqued down. No special tools are necessary to make the connection.

End plug o-ring—an o-ring is provided on the end plug to seal the connection against water entry.

End plug snap ring—a provision for including a snap ring on the end plug is provided so that the user may optionally prevent one end of the cable from being removed when the lock is released. The snap ring would be secured in place on the end plug after the end plug is inserted through the housing cover.

Tamper-proof end plugs—the openings in the housing for the end plugs are configured to prevent a forced separation of the end plug from the cable while the end plug is locked in place in the housing.

Multiple openings in housing—the design provides for additional pairs of sockets in the housing so that multiple cables can be secured to the housing at the same time.

Opposing movement of locking plates/low force motor—this design uses multiple locking plates that move in different releasing directions to help deter unwanted release. A motor, actuated by a card reader, rotates a double-lobed cam which, in turn, acts upon the opposing locking plates, preferably via opposing roller followers. The followers are attached to pins which move the locking plates in different directions. Roller followers are used to reduce friction so that a low force motor can be used.

Locking plate bias springs of different wire diameter or coil spacing to deter unauthorized release—the locking plate bias springs are wound to resonate at different vibration frequencies, to inhibit simultaneous unauthorized movement of the locking plates.

Cam position and locking plate unlocked sensors—one Hall-effect sensor is used to detect when the motor/cam is in its locked position and its unlocked position. When sensed to be in its unlocked position, the motor is stopped and held in that position for a time period and then it rotates in an opposite direction back to its locked position. A second set of Hall-effect sensors detect when the locking plates are in their unlocked position. Thus, when a signal is received that the locking plates are unlocked while another signal is received that the motor/cam is in its locked position, an unauthorized release of the lock may be detected.

Cable breach detection—several methods of detecting a breached cable are disclosed. A first method of detecting a breach is by detecting a change of electrical resistance in the cable itself. This method requires that the plug ends be electrically insulated from the lock plates by being plated by hard anodizing. The design contemplates "teaching" the circuitry the resistance of a non-breached cable each time the cable is inserted into the housing. Another method is by a vibration transmitter/receiver located at the ends of the cable. A vibration signal through the cable would change or not be received if the cable were cut or severed. Further methods include the measurement of a time-domain reflectometry (TDR) signal pulsed through the cable for detecting a cable breach or the use of an insulated wire embedded in the stranded cable to measure wire continuity for detecting a cable breach. In one aspect of the invention, more than one insulated wire may be embedded in the cable with only one of the embedded wires establishing electrical continuity between the cable ends. Thus, an intruder would not know which wire could be jumped to avoid detection of a cable separation.

Plug retention plate—a feature is provided to retain the plug in the housing even when the locking plates are in the unlocked position. In addition to the locking plates, a retention plate is provided that serves to hold the plug in the housing even when the locking plates are in their unlocked position. The profile of the end plug provides for a two-way taper to engage plug retention plate, and one-way tapers to engage the locking plates.

Reversible locking plates—the top and bottom locking plates may be identical and interchangeable for manufacturing purposes.

Housing breach detection—a Hall-effect sensor may be used to detect when the cover is removed from the housing without authorization.

Tamper resistant housing cover—two additional screws used to mount the cover to the housing are accessible only through access holes in the cover. Access to the screws is blocked unless the key is used first to turn the cylinder lock.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
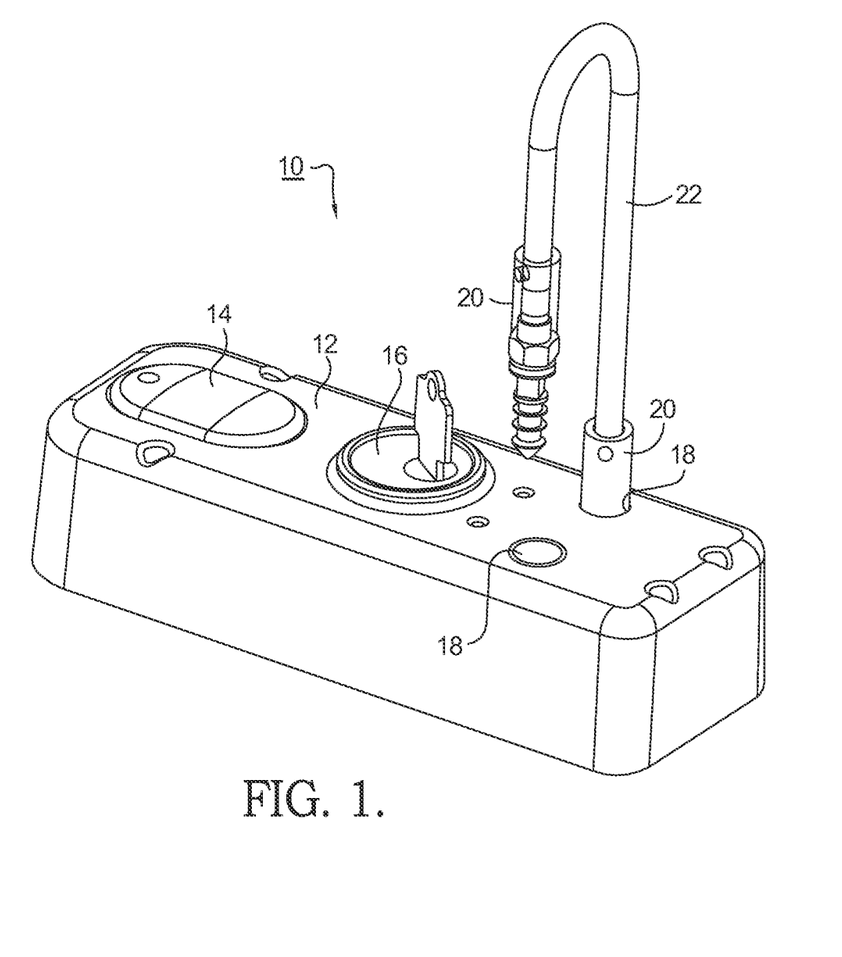
FIG. 1 is an isometric view of the electric cable lock system, in accordance with the invention.
Figure 2:
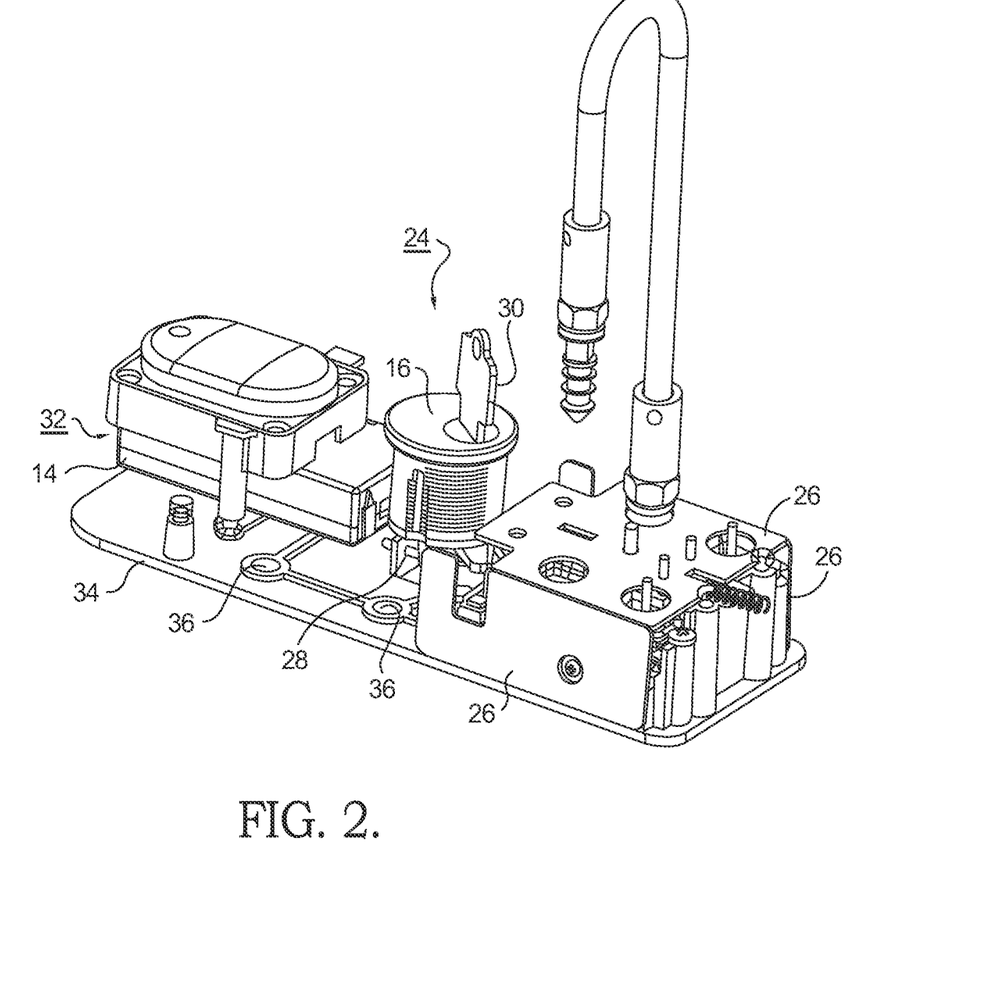
FIG. 2 is an isometric view of the system shown in FIG. 1 with the housing cover removed, in accordance with the invention.
Figure 3:
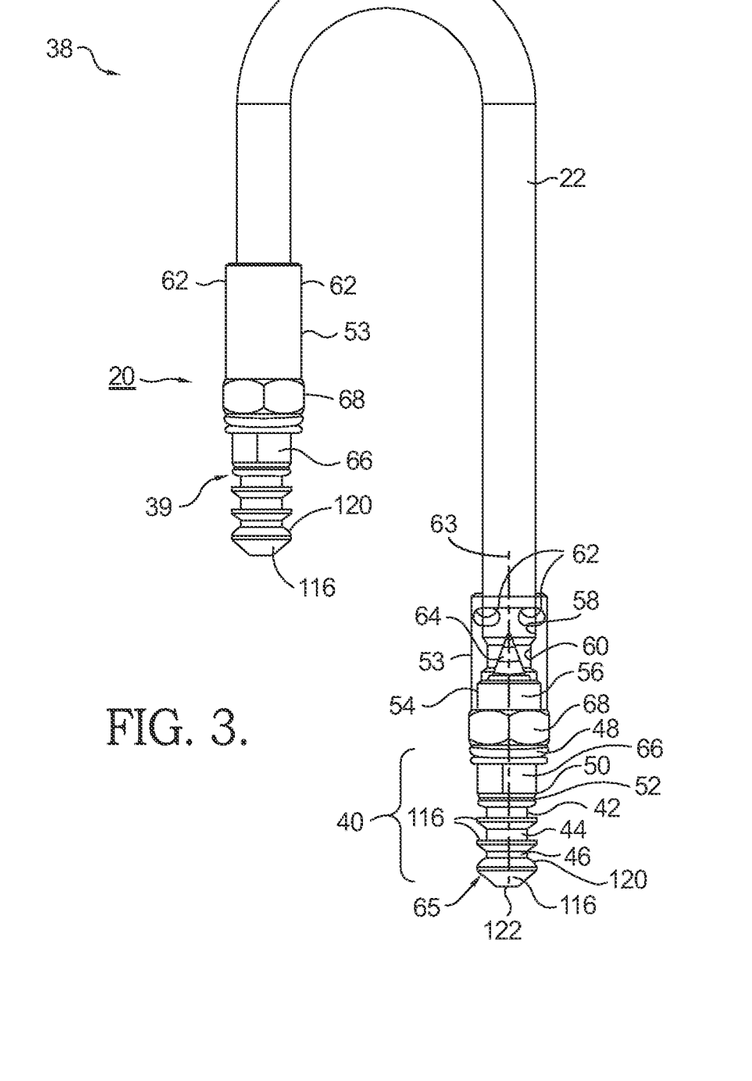
FIG. 3 is a view of the plug assemblies and cable, with one end shown in phantom, in accordance with the invention.
Figure 3A:
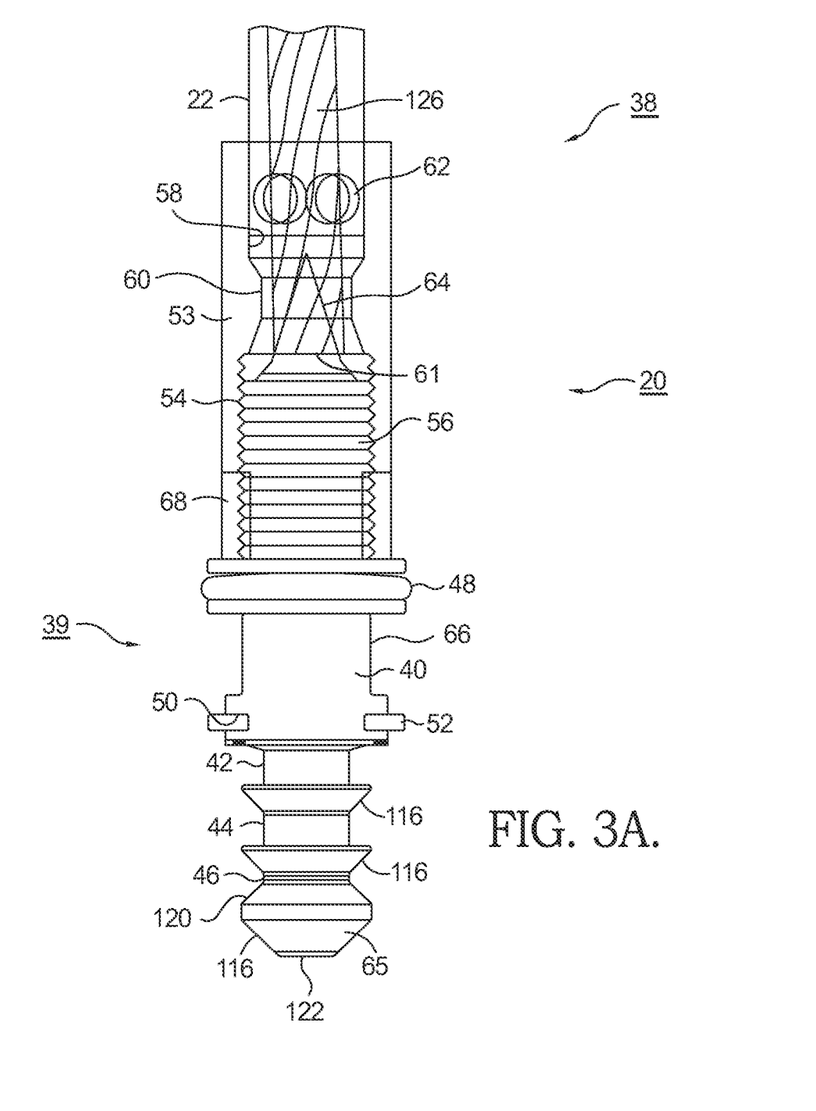
FIG. 3A is a close-up view of the plug and cable connection, as shown in FIG. 3.

Referring to FIGS. 1 through 3 and FIG. 3A, a first embodiment 10 of an electronic cable lock system in accordance with the present invention comprises a housing cover 12 having a card/credential reader module 14, a barrel lock cylinder 16 for manual operation, and two openings 18 for receiving a cable plug assembly 20 attached to either end of a cable 22. Cable 22 may be comprised of several individual strands of wire wrapped tightly together such as shown in FIG. 3A and commonly referred to as aircraft cable. In one aspect of the invention, the cable itself may be configured as a conductor covered with a high strength stainless steel flexible casing.

A partially exposed internal structure of the cable lock mechanism 24 shown in FIG. 2 includes three hardened sheet metal plates 26 to provide security against drilling. A microswitch 28 or similar detector provides an indication whether a proper key 30 has been inserted into cylinder 16 and rotated. A microcontroller 32 is mounted to the underside of the card reader module 14. A housing base 34 with mounting holes 36 allows the mechanism to be mounted to a plurality of structures such as electrical boxes, posts, walls, etc.

Referring to FIGS. 3 and 3A, and for clarity purposes, a transparent view 38 of plug assembly 20 shows the cable 22 inserted into plug assembly 20. Cable plug assembly 20 includes plug 39 and plug collar 53. As described in more detail below, plug 39 and collar 53 are joined together to mechanically secure cable 22 to first plug assembly 20.

Plug 39 includes first plug end 40 and second plug end 56. First plug end 40 contains two slots 42, 44 for accepting locking plates (not shown). A third slot 46 may be included to receive a spring loaded detent plate (not shown). The operation of the locking plates and the optional detent plate in conjunction with plug assembly 20 is discussed in more detail below.

An o-ring 48 seals the connector within the housing cover 12 to keep out elements such as dirt and moisture. A snap ring 52 and groove 50 may be included to allow plug assembly 20 to be optionally non-removably affixed to housing cover 12 if so desired. This is accomplished by inserting plug assembly 20 into housing cover 12 when removed from base 34 and installing a snap ring 52 into groove 50. The outer diameter of installed snap ring 52 is slightly larger than the clearance diameter of openings 18 in housing cover 12 thereby preventing plug assembly 20 from being removed from the housing once the snap ring is in place. This allows the end user to permanently affix the right or left plug as desired, so that only one end of the cable is removably lockable to the housing. Alternatively, neither plug may be affixed with the snap ring, thus allowing the end user to remove the cable completely for convenience purposes such as, for example, for temporary storage, to easily replace the entire cable, or to change cable lengths.

Plug collar 53 of plug assembly 20 has a tapped bore 54 for receiving mating threads of second plug end 56; a counter bore 58 to receive cable 22; a locking bore 60; and a tapped hole(s) 62 to receive a set screw (not shown). Second plug end 56 has a cone shaped feature 64 to bore into strand ends 61 of cable 22 and to cause the end strands of cable 22 to be radially forced outwards against the locking bore 60, pinching the end of the cable between feature 64 and bore 54. Cone shaped feature 64 is directed along a longitudinal axis 63 of plug 39. Additionally, first plug end 40 has a tip 65 to make electrical contact with a circuit board (not shown) within the unit, if needed.

Cable 22 is attached to plug assembly 20 by inserting an end of cable 22 into counter bore 58 of plug collar 53, and by temporarily locking the cable in place to plug collar 53 with a set screw in tapped hole(s). Then second plug end 56 of plug 39 is threaded and tightened into collar 53 to a predetermined torque. First plug end 40 of plug 39 has flats 66 that allow plug 39 to be firmly torqued with a tool such as an open ended wrench against plug collar 53. Plug collar 53 may also have flats 68 to hold the collar from rotating while a torque is applied to plug end 39. After the predetermined torque is reached, and after the end of cable 22 is pinched between feature 64 and bore 60, even with the removal of the set screw(s), the plug assembly grips the cable tightly. This method of attaching a cable to a fitting may be lower in cost and more convenient than prior art designs since no special tools are required as with prior art crimp-type connections.

Note that, in one aspect of the invention, the general cross section of plug 39 and the cross section of openings 18 are circular. Further, the outside diameter of first plug end 40 is sized to fit snuggly into opening 18 in housing cover 12 and, when plug assembly 20 is fully inserted into opening 18 and locked in place, first plug end 40 is configured to be entirely below the outer surface of housing 12. Thus, if an attempt were made to unscrew plug collar 53 from first plug end 40 after being locked in place, plug collar 53 and first plug end 40 would rotate together, thereby preventing collar 53 and plug end 40 from being separated.

Figure 4:
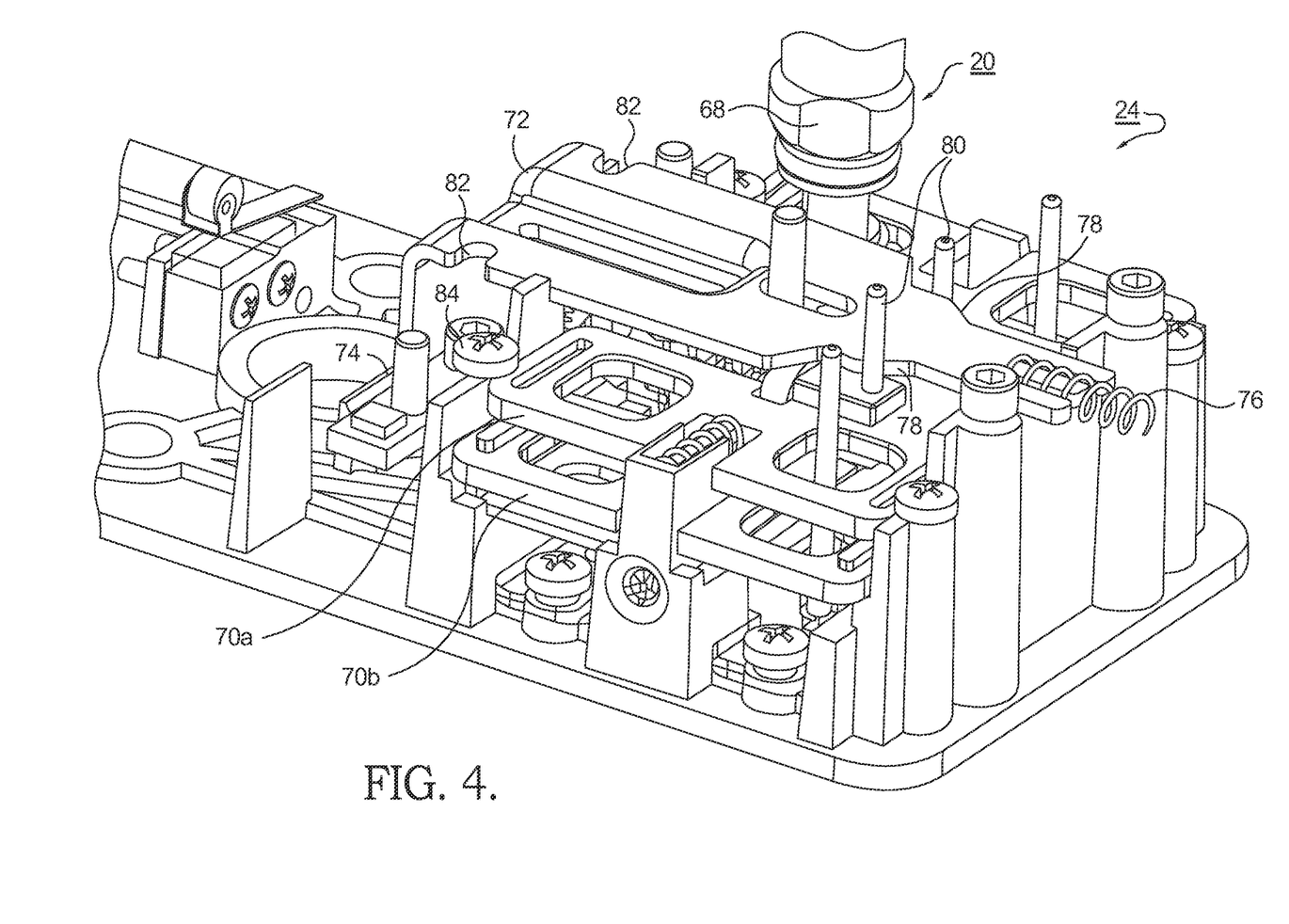
FIG. 4 is a partial view of cable lock mechanism, in accordance with the invention.
Figure 5:
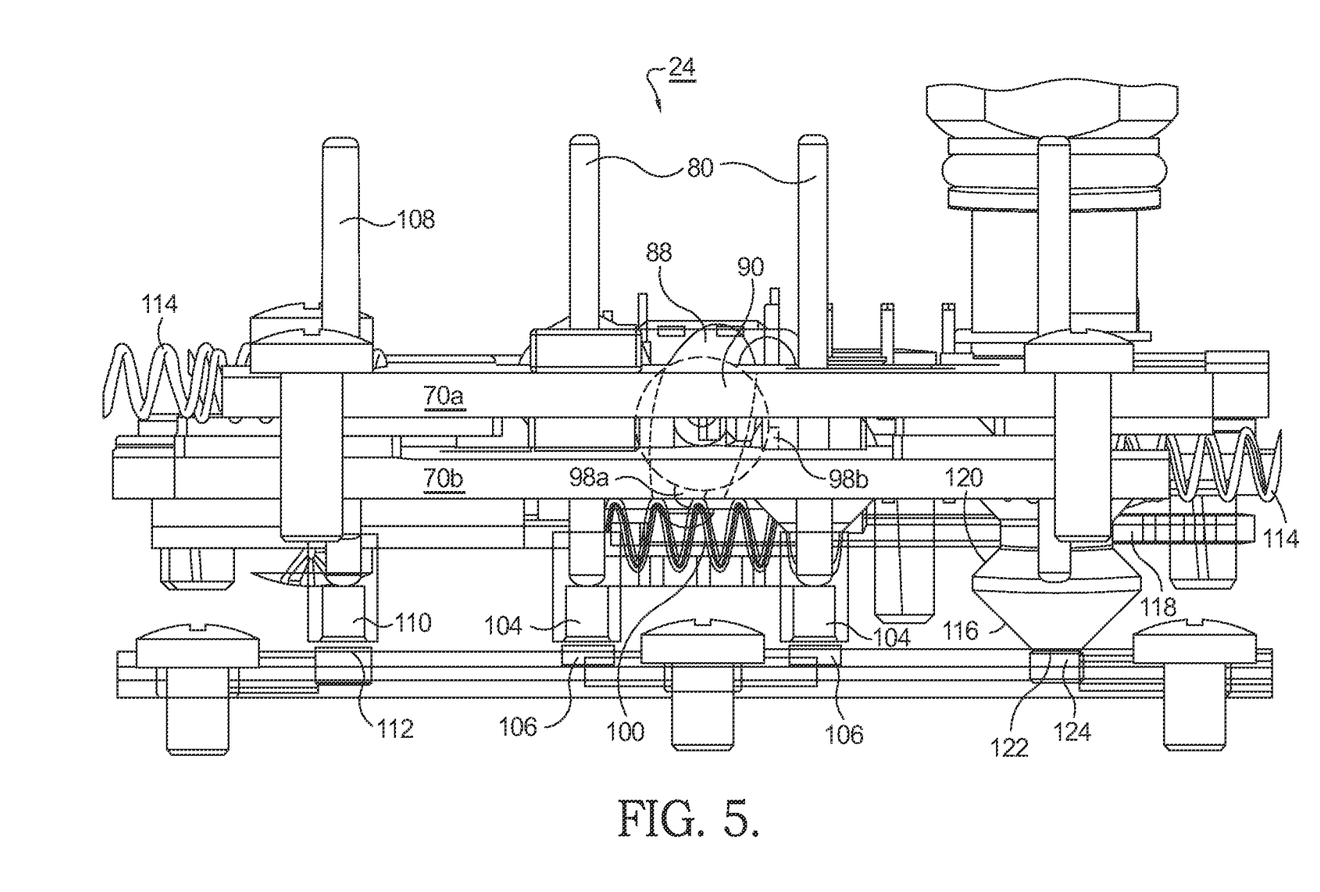
FIG. 5 is a side view of the cable lock mechanism including the locking plates and plug assembly, in accordance with the invention.
Figure 6:
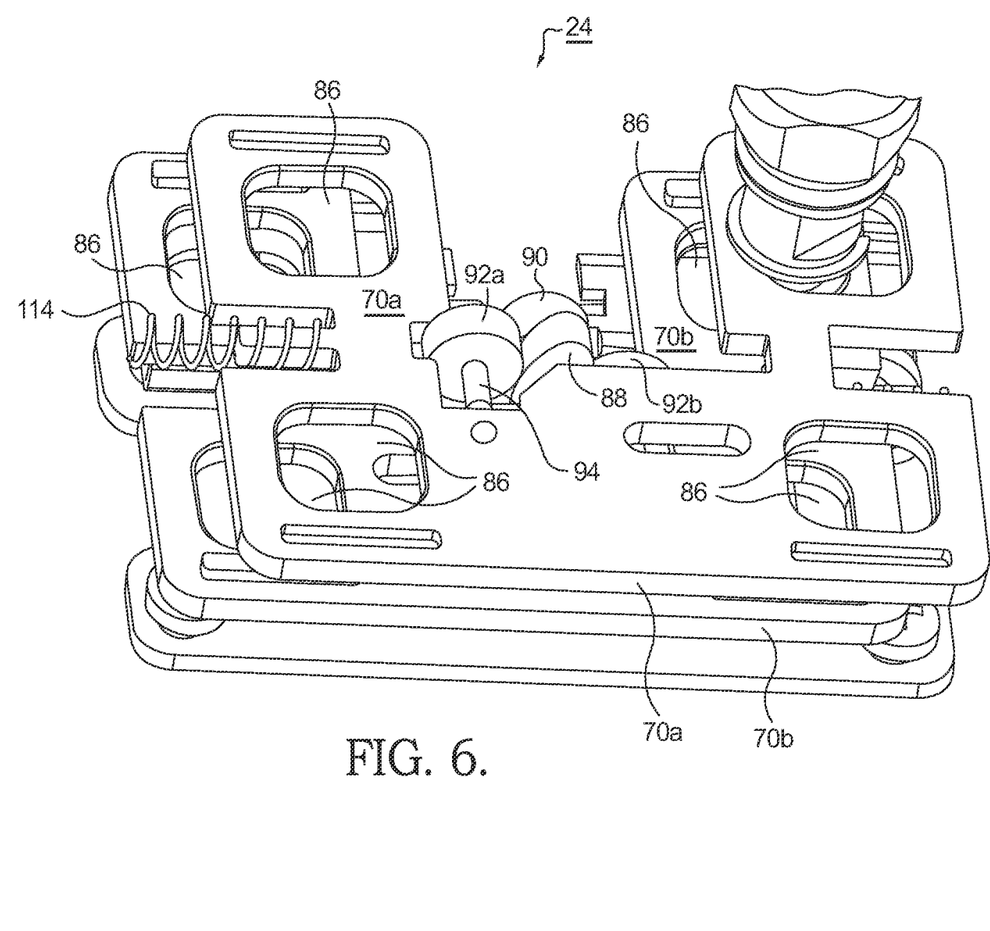
FIG. 6 is an isometric view of the cable lock mechanism showing the locking plates and their surrounds, in accordance with the invention.

Referring to FIGS. 4 through 6, mechanism 24 as depicted is further exposed. Twin locking plates 70a, 70b are spring loaded in opposite directions and are normally locked into slots 42, 44, respectively, on first plug end 40 (FIG. 3). A key override bracket 72 is biased towards cylinder cam 74 by compression spring 76. Override bracket 72 includes cam surfaces 78 that interact with two pins 80; each pin is pressed into locking plates 70a, 70b, respectively. When cylinder 16 is rotated by key 30 (FIG. 2), cylinder cam 74 pushes override bracket 72 against spring 76, causing cam surfaces 78 to push pins 80 apart, thus pushing locking plates 70a, 70b apart and releasing cable plug assembly 20 as shown in FIG. 4.

Additionally, override bracket 72 has two notches 82 that block access to screws 84 that hold housing cover 12 to housing base 34 when override bracket 72 is in the key-removed position. Thus, removal of housing cover 12 from housing base 34 requires key 30 to be used to first move override bracket 72 to the unlocked position wherein access to screws 84 is then permitted through access holes 85 in cover 12 (FIG. 1).

It should be noted that locking plates 70a, 70b have additional openings 86 (FIG. 6) that, with the removal of knock-out plugs in housing cover 12, can be used to accept two more plug assemblies 20. This allows a user to have additional cables 22 that can be locked by cable lock system 10 and thus provide added utility. One skilled in the art can see how the design can be scaled up to accept any number of additional cable plugs 20 without deviating from the scope of the invention.

It should also be noted that, in the particular design shown, locking plates 70a, 70b are intentionally biased for movement in opposite directions to provide added security. One known method used to defeat locks is a technique known in the industry as "bumping". A lock may be struck with a hammer for instance that causes the internal locking mechanism to move in reaction to the blow in such a way as to temporarily unlock, allowing a breach of the lock. By having a plurality of overlapping locking plates 70, preferably two, moving in different, and preferably opposite, directions, it becomes unlikely that both locking plates 70a, 70b will unlock simultaneously as a result of the lock mechanism being struck. At worst, one locking plate (i.e. 70a) will unlock while the second locking plate (i.e. 70b) will remain locked. While locking plates 70a, 70b are shown as two plates moving in opposite direction to unlock, it is understood that more than two locking plates can be utilized to reduce the tendency of unlocking all plates by bumping and that plates can be designed to move in different directions other than opposite, such as for example at right angles, to further reduce the tendency.

Further, the different locking plates can utilize springs having differing resonant frequencies that cannot vibrate in unison such that the probability of all plates unlocking simultaneously when the housing is struck is almost zero.

FIGS. 5 and 6 show views of mechanism 24 in a locked state. An elliptically shaped cam 88 is mounted on a shaft (not shown). The shaft and cam 88 are rotated by a motor (not shown) between a locked position of the cam as shown and an unlocked position 90° from the locked position. Elliptically shaped cam 88 pushes on two roller cam followers 92a, 92b journaled on pins 94 mounted to locking plates 70a, 70b. Thus, when cam 88 rotates and pushes against roller cam followers 92a, 92b, locking plates 70a,70b move from a locked position to an unlocked position.

Two magnets 98a, 98b are mounted on a circular shoulder 90 of cam 88. The magnets may be of differing polarity orientation affixed to it 90° apart. Magnets 98a, 98b interact with a first linear Hall-effect sensor 100 to serve as a cam rotary position sensor. At the locked position shown in FIGS. 5 and 6, magnet 98a points down (6 O'clock) at Hall-effect sensor 100. When cam 88 turns clockwise 90° to reach an unlocked position, opposite-polarity magnet 98b points down at Hall-effect sensor 100. A signal is sent by sensor 100 to a controller circuit (not shown) of the microcontroller instructing the motor when cam 88 has reached either its unlocked position or its locked position.

Referring again to FIG. 5, at the bottom ends of pins 80 are two more magnets 104 that interact with two more Hall-effect sensors 106. As shown, the locking plates are in their locked position and magnets 104 are aligned with Hall-effect sensors 106. If one or both locking plates 70a, 70b are moved to an unlocked position without cam 88 being in its unlocked position (magnet 98b aligned with Hall-effect sensor 100), an alarm code may be sent by the microcontroller and an alarm sounded. Note that magnets 104 may become not aligned with Hall-effect sensors 106 without cam 88 being in its unlocked position when key override bracket 72 moves pins 80 by turning the barrel lock cylinder 16 with key 30. In that situation, an erroneous alarm code could be sent. However, when lock cylinder 16 rotates to move the locking plates, a micro-switch 28 (FIG. 2) under cylinder 16 also opens. When microcontroller 32 senses a change of state of both the micro-switch 28 and both Hall-effect sensors 106, it recognizes that a key is being used and the locking plate override is proper. If the processor senses one or both Hall-effect sensors have changed state without the micro-switch changing state or a proper credential applied (such as the cam drive motor being activated), the microcontroller signals that an unauthorized entry is being attempted. Note that, when the lock is accessed properly with a credential or key, both pins 80 move simultaneously. Since both locking plate pins have their own Hall-effect sensors, as shown in FIG. 5, if the microcontroller ever senses that only one of the two switches has changed state, an alarm signal may be sent. Thus, the microcontroller and circuitry may be designed to send an alarm code in the event of only one of magnets 104 being aligned with its associated Hall-effect sensor 106 and the other one of magnets 104 being not aligned with its associated Hall-effect sensor 106.

Note that, in an alternate embodiment, Hall-effect sensor 100 may be removed and, in its place, sensors 106 and magnets 104 could serve indirectly as a cam rotary position sensor. That is, when the magnets 104 are aligned with sensors 106, as shown in FIG. 5, it would sense, directly, the positions of the locking plates and, indirectly, the position of cam 88, assuming that cam 88 had rotated to position the locking plates as shown. When the magnets 104 are not aligned with sensors 106, it would conclude that cam 88 is in an unlocked position. However, in such an embodiment, if the cable plug were partially inserted in the housing, thereby holding the locking plates in their unlocked position, and the motor were to begin to rotate the cam in a direction to lock the locking plates, the microcontroller could lose track of the angular position of the cam. To alleviate this condition, the microcontroller may be programmed such that, if movement of the locking plates is not sensed upon an initial rotation of the cam toward the locking position, power to the motor is turned off then turned back on after some preprogrammed time period to assure that the plug is no longer partially inserted.

In another aspect of the invention, Hall-effect sensor 100 is designed to provide an analog signal to the microcontroller as opposed to a digital signal. Hall-effect sensors 106 may be designed to provide either analog or digital signals to the microcontroller, although an analog signal may be preferred to more accurately detect the precise position of the locking plates.

Referring again to FIG. 5, an additional magnet/Hall-effect sensor is used to detect unwanted entry into the system should the housing cover be removed without authorization. As shown, cover pin 108 is pressed into housing cover 12. Magnet 110 is affixed to the end of pin 108 and is aligned with a third Hall-effect sensor 112 when the housing cover is in place. Thus, an alarm code is sent when housing cover 12 is removed without authorization.

Upon presentation of proper credentials/authorization, microcontroller 32 is programmed to cause the motor (not shown) in system 10 to rotate cam 88 ninety degrees from a parked, locked position to an unlocked position. Microcontroller 32 is further programmed to hold cam 88 in its unlocked position for a predetermined period of time and then return cam 88 in an opposite direction to its parked, locked position. The predetermined period of time would be selected as appropriate for the application.

During the predetermined period of time in which the locking plates remain held in their unlocked position by cam 88, it is desirable that plug assembly 20 be held in place in its mating opening 18 without falling out. This is especially desirable when system 10 is mounted so that housing cover 12 faces downward. Referring again to FIG. 5, detent plate 118 is spring loaded in a direction to become seated in third slot 16 (FIG. 3) of cable plug assembly 20 when plug assembly 20 is fully inserted into housing cover 12. Since detent plate 118 works independent of locking plates 70a, 70b, that is, detent plate 118 is always biased in a direction toward an inserted cable plug assembly regardless of the positions of the locking plates, the cable plug assembly will be held in place in its mating opening without falling out, even when the locking plates are in their unlocked position. Thus, even with the device unlocked (and without snap ring 52 in use), a force must be applied to cable plug assembly 20 to remove it from housing cover 12.

As best seen in FIG. 5, when elliptical cam 88 is rotated 90 degrees as shown, the locking plates 70a, 70b are biased by springs 114 into a locked state. At the theoretical fully open position of the locking plates, the normal force between cam followers 92a, 92b and cam 88 acts directly through the camshaft center, hence there is no leverage for the springs to rotate the cam away from the unlocked, fully open position and the motor does not need to exert any force to hold the cam in its unlocked position. In one aspect of the invention, the cam profile may have a larger "dwell" period at the nose of the cam so that even if the cam doesn't stop at the exact center of its fully unlocked position, the normal force will still act through the camshaft center. Further, in another aspect of the invention, the motor may be coupled to a transmission having a very large gear reduction (for example, 297:1) so it takes a relatively large amount of torque to back-drive the motor through the gearing.

Note that even when locking plates 70a, 70b are in a locked state, cable plug assembly 20 may be inserted into mechanism 24. One-way cam surfaces 116 (FIGS. 3, 3A and 5) disposed at the tip of second end 56 of plug assembly 20 and adjacent one side of slots 42 and 44, push the locking plates 70a, 70b and detent plate 118 temporarily out of the way until slots 44, 42 line up with locking plates 70a, 70b and compression springs 114 can bias the locking plates into their respective slots. This allows a user to unlock with proper credentials and re-lock at his convenience. Note that an opposite one-way cam surface 120 is disposed adjacent one-way cam surface 116 at the tip of plug assembly 20 so that detent plate 118 can be moved out of the way when plug assembly 20 is pulled out of cable lock mechanism 24 while locking plates 70a and 70b are in their unlocked position. Note also that opposing one-way cam surfaces are not similarly provided adjacent slots 42, 44 to assure that plug assembly 20 cannot be pulled out of cable lock mechanism 24 when locking plates 70a and 70b are in their locked position.

Another security measure provided in accordance with the invention is to monitor the integrity of the cable through electronic means, such that a cut or severed cable may be detected. A first method requires the cable plug to be plated with a dielectric material such as hard anodizing, except plug tip 122 of second end 56 that makes electrical contact with circuit board 124 and a portion of cone shaped feature 64 that makes electrical contact with cable 22. After both cable plug assemblies 20 have been inserted into mechanism 24 and both assemblies have made electrical contact with their respective contacts on circuit board 124, the microcontroller will make note that continuity through cable 22 has been made. After a short duration, and at predetermined intervals thereafter, the microcontroller measures the electrical resistance through the cable. An alarm code will be sent by the microcontroller if a predetermined change in resistance (e.g., +/−30%) in the cable is measured, signifying that the cable has been cut into or severed or, in any fashion, removed from mechanism 24 without proper authorization. In one aspect of the invention, a base resistance measurement is taken after continuity has been established each time the lock is locked. This method of measuring a baseline resistance first can therefore accommodate the use of different lengths of cable with noticeably different resistances. This method also makes it more difficult for cable 22 to be "jumpered" and then cut between the shorted section of the cable without setting off the alarm. Note that, in a currently preferred method, the base resistance measurement may be taken automatically. In the alternative, a base measurement can be initiated manually, for example, by turning lock cylinder 16 in a direction opposite the direction to unlock the mechanism to trip a micro-switch and to initiate the base measurement event. In a variation of this embodiment, rather than the cable strands themselves serving as the conductor for measuring continuity, a smaller sized insulated wire 126 may be intertwined within the cable wires and electrically connected to the end plugs, as shown in FIG. 3A. Thus, if an attempt is made to sever the cable, the insulated wire would be severed or damaged as well, either indicating a short or an open, and thereby detecting a breached cable. In an enhancement of this variation, multiple insulated wires 126 may be embedded in the cable strands with only one or a few of the wires being electrically connected to the end plugs. Thus, it would be nearly impossible to determine the correct wire to jumper in order to bypass the detection system.

A second method utilizes a sound transmitter (not shown) on one end of the cable and a receiver on the other end. Knowing that an acoustic pulse takes a predictable amount of time to travel through any medium, the density of the medium is the primary factor in determining the speed at which the pulse itself can travel. In a consistent medium, the speed will be more or less constant so one can determine the length based on how long the pulse takes to travel from one end to the other. Alternately, when a pulse hits a change in medium, a portion of it will reflect back towards the origin. Using this concept, one can generate a pulse and measure it either at the other end or at the original end after it has been reflected. Thus, an alarm may be triggered if a sound signal is sent into the cable and not received or if a sound signal is received outside a predetermined acceptable level or time limit. As a further embodiment in accordance with the invention, the transmitter may send a signal of a predetermined frequency that can be randomly varied by the microcontroller. Various filtering techniques can also be employed to make false alarms unlikely.

In another method, a piezoelectric buzzer (not shown) may be installed on spring-loaded receptacles on each end of the cable. The spring-loaded receptacles can allow for the necessary contact between the buzzer and the cable end while protecting them from shock during insertion. An acoustic pulse is then produced through the buzzer (for example, by using a capacitor to provide enough current to make the amplitude of the pulse greater) at one end of the cable. A second piezoelectric buzzer at the other end of the cable end receives the pulse (through vibration) and generates a current, which in turn creates a measurable voltage. The time between when the pulse was produced by the first buzzer and when it is received by the second buzzer can be considered constant assuming that all other variables remain more or less constant. Thus, when a pulse is sent by the first buzzer and not received by the second buzzer or received by the second buzzer outside a predetermined predicted range, the microcontroller can send an alarm code that the cable has been cut or severed.

In yet another method, measurement of the inductance of the cable is used to monitor whether the cable has been cut or severed. Each time the cable is inserted into the housing and locked, the inductance of the cable is measured and stored into memory. The cable inductance is then continuously measured and compared to the stored value. The alarm will be triggered whenever the measured inductance deviates a predetermined amount from the initially stored amount, signaling that the cable has been cut or severed. This method can also detect if a substitute cable has been used to possibly defeat the alarm by comparing the inductance of the cable being used to some predetermined level of inductance representing the inductance level of a previously used cable.

In yet another embodiment, time-domain reflectometry may be used to verify the length and consistency of a premeasured base cable and thus detect whether the cable has been damaged or severed.

Note that more than one of the mentioned methods of detecting a cut or severed cable may be used to provide redundancy or to minimize inconvenient false alarms. For example, the mechanism may also be programmed such that two or more sensing methods must signal an alarm condition before an official alarm is sent.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:
1. An electromechanical cable lock system comprising:
   a) an electromechanical locking mechanism;
   b) a cable having a plug end receivable in said locking mechanism; and
   c) a plurality of planar locking plates directly engageable with said plug end in said locking mechanism, wherein said plurality of planar locking plates are configured to move linearly to engage said plug end, wherein at least one of said plurality of planar locking plates moves in a first direction to engage said plug end, wherein a second of said plurality of planar locking plates moves in a second direction to engage said plug end, and wherein said first and second directions are different.

2. The system in accordance with claim 1 wherein said first and second directions are opposed.

3. The system in accordance with claim 1 further comprising a motor-driven cam mechanism for moving at least one of said planar locking plates.

4. The system in accordance with claim 3 further comprising a roller follower operationally disposed between said cam mechanism and said at least one planar locking plate that is moved by said cam mechanism.

5. The system in accordance with claim 1 further comprising at least one hardened steel plate surrounding said electromechanical locking mechanism.

6. The system in accordance with claim 1 further comprising a barrel lock configured to move said planar locking plates in one of said first or second directions.

7. The system in accordance with claim 6 further including a housing base and a housing cover configured to enclose said planar locking plates and at least one fastener for connecting said cover to said base, wherein movement of said barrel lock in one rotational direction blocks access to said at least one fastener and movement of said barrel lock in another rotational direction unblocks access to said at least one fastener.

8. An electromechanical cable lock system comprising:
   a) an electromechanical locking mechanism;
   b) a cable having a plug end receivable in said locking mechanism, wherein said plug end comprises a locking plug portion having a pointed end inserted into an end of said cable, and a collar portion releasably secured onto an outer surface of said cable; and
   c) a plurality of slidable locking plates engageable with said plug end in said locking mechanism, wherein at least one of said plurality of slidable locking plates moves in a first direction to engage said plug end, wherein a second of said plurality of slidable locking plates moves in a second direction to engage said plug end, and wherein said first and second directions are different.

9. The system in accordance with claim 1 further comprising a tamper detection mechanism including at least one Hall-effect position sensor.

10. The system in accordance with claim 3 wherein said motor-driven cam mechanism further comprises at least one Hall-effect position sensor for detecting a rotary position of said motor-driven cam mechanism.

11. The system in accordance with claim 10 further comprising a barrel lock cylinder and a Hall-effect sensor for detecting a rotary position of said barrel lock cylinder.

12. The system in accordance with claim 3 further comprising a card reader module operationally connected to said motor-driven cam mechanism.

13. The system in accordance with claim 1 further comprising a housing surrounding said electromechanical locking mechanism and having at least one port for receiving said plug end into said electromechanical locking mechanism.

14. The system in accordance with claim 13 further comprising at least one Hall-effect sensor disposed to detect removal of said housing.

15. The system in accordance with claim 1 wherein said planar locking plates are formed of a non-conductive material.

16. The system in accordance with claim 1 further comprising a cable breach detection mechanism.

17. The system in accordance with claim 16 wherein said cable breach detection mechanism includes said plug end electrically insulated from said planar locking plates wherein said system monitors an electrical resistance of said cable.

18. The system in accordance with claim 16 wherein said cable breach detection mechanism includes a vibration transmitter/receiver located at each end of said cable wherein a vibration signal sent through said cable would change or not be received if said cable is breached.

19. The system in accordance with claim 16 wherein said cable breach detection mechanism includes a time-domain reflectometry signal pulsed through said cable.

20. The system in accordance with claim 16 wherein said cable breach detection mechanism includes an insulated wire within said cable wherein a current directed through said insulated wire is monitored to detect a breach in said wire.

21. The system in accordance with claim 20 wherein said cable breach detection system includes a plurality of insulated wires of a number N within said cable and wherein less than a number of N wires receive current for detecting said breach.

22. An electromechanical cable lock system comprising:
a) an electromechanical locking mechanism;
b) a cable having a plug end receivable in said locking mechanism; and
c) first and second slidable locking plates engageable with said plug end in said locking mechanism, wherein said first slidable locking plate moves in a first direction to engage said plug end, wherein said second slidable locking plate moves in a second direction to engage said plug end, and wherein said first and second directions are different.

23. An electromechanical cable lock system comprising:
a) an electromechanical locking mechanism;
b) a cable having at least one plug end receivable in said locking mechanism, wherein said cable is fitted within a collar portion of said plug end with said plug end further comprising a locking plug portion having a pointed end inserted into an end of said cable to securely mount said cable between said pointed end and an interior surface of said collar portion; and
c) a plurality of slidable locking plates engageable with said at least one plug end in said locking mechanism, wherein at least one of said plurality of slidable locking plates moves in a first direction to engage said at least one plug end, wherein a second of said plurality of slidable locking plates moves in a second direction to engage said at least one plug end, and wherein said first and second directions are different.

24. An electromechanical cable lock system comprising:
a) an electromechanical locking mechanism;
b) a cable having at least one plug end receivable in said locking mechanism, wherein said cable is fitted within a collar portion of said plug end with said plug end further comprising a locking plug portion having a pointed end inserted into an end of said cable to securely mount said cable between said pointed end and an interior surface of said collar portion, wherein said pointed end is cone shaped; and
c) a plurality of slidable locking plates engageable with said at least one plug end in said locking mechanism.

25. A method of attaching a cable to a plug assembly wherein said plug assembly includes a collar and an end plug, said method comprising the steps of:
a) inserting an end of said cable in said collar;
b) locking said cable in place in said collar;
c) piercing an end of said cable with a pointed end of said end plug to securely mount said cable between said pointed end and an interior surface of said collar, wherein said pointed end is cone shaped; and
d) rotatably securing said end plug into said collar to a predetermined torque.

* * * * *